Sept. 16, 1941.   B. E. LUBOSHEZ   2,256,396
PROJECTION PRINTER
Filed Aug. 7, 1940   9 Sheets-Sheet 4

BENJAMIN E. LUBOSHEZ
INVENTOR

BY
ATTORNEY

Sept. 16, 1941.   B. E. LUBOSHEZ   2,256,396
PROJECTION PRINTER
Filed Aug. 7, 1940   9 Sheets—Sheet 7

BENJAMIN E. LUBOSHEZ
INVENTOR

BY
ATTORNEY

Patented Sept. 16, 1941

2,256,396

UNITED STATES PATENT OFFICE 2,256,396

PROJECTION PRINTER

Benjamin E. Luboshez, Rochester, N. Y., assignor to Eastman Kodak Company, Rochester, N. Y., a corporation of New Jersey Application August 7, 1940, Serial No. 351,761

14 Claims. (Cl. 88—24)

This invention relates to projection printers for photographic purposes.

It relates generally to the same subject matter as my copending applications Serial Nos. 351,763 and 351,762 filed concurrently herewith, the latter jointly with Ralph M. Evans.

It is the general object of the invention to provide a projection printer for making prints, usually on paper, from transparencies.

It is a particular object of the invention to provide a projection printer for making color prints from color transparencies. The specific objects of the invention are listed below.

1. It is an object of the invention to provide a projection printer which is convenient in operation and particularly convenient as far as manipulation of the original transparency is concerned.

2. It is an object of the invention to provide a printer for handling sensitive paper in large rolls. That is, it is an object of the invention to provide a printer for making prints of constant width even when at different magnifications.

3. It is an object of the invention to provide an easy and quick method of selecting the proper magnification to give a print of this constant width.

4. It is an object of the invention to provide a printer which will have the above features and is capable of handling different shaped originals.

5. It is an object of the invention to provide means for length masking of the original to be printed.

6. It is an object of the invention to provide length masking means which change with magnification and which can be separately changed with the shape of the original.

7. It is an object of the invention to provide a printer in which prints can be made on large rolls of paper and in which automatic means are provided for advancing the paper between exposures.

8. It is an object of the invention to provide a printer of this type in which prints of different shapes, i. e. different lengths can be made without waste of paper.

9. That is, it is an object of the invention to provide paper advancing means which will eliminate waste of paper.

10. It is an object of the invention to provide an arrangement of this type in which the masking of the paper is entirely automatic and is operated by the same controls which operate the masking of the original.

The invention will now be described with particular reference to making a positive color print on paper from a positive color transparency. However, except for those features involving color, the invention is equally applicable to various processes such as the simple one wherein a positive paper print is made from an ordinary negative.

According to the invention, the general and specific objects listed above are accomplished by combining the following features in a printer. In order to permit easy manipulation of the original color transparency or other photographic record, for selection of the portion to be printed and for masking, a horizontal gate is provided for holding this transparency and this gate is illuminated from below. When making prints on relatively large rolls of paper it is necessary to use a heavy strong roll holder. Focusing such a heavy roll holder is most accurately and easily obtained with horizontal movement thereof and hence a vertical printing gate is provided. To form an image of the record gate on the printing gate a reflector and lens is used, the lens being preferably between the reflector and the printing gate to permit the reflector to be used for an additional purpose.

As the gates are moved relative to the lens for different magnifications, correct focus is maintained by suitable coupling means therebetween. According to the invention specifically described here, the width of the printing gate is fixed, and the record and printing gates are preferably but not necessarily horizontal and vertical respectively as described above. In the preferable embodiment wherein this printing gate is vertical, the width is usually the height merely because the majority of pictures are taken with the long side horizontal and the observer prefers to manipulate the original record in the corresponding way. The prints being made lengthwise of the roll (the constant width feature being due to this fact) the rolls are also vertical. To feed the paper through the printing gate, the supply and take-up rolls are positioned at opposite ends of the printing gate or in some equivalent position with guide rollers at the opposite ends of the gate.

Lateral masks are provided for masking the width of the record gate and these masks are coupled to the vertical movement of this gate so that the masks change automatically with the magnification, the width being inversely proportional to the magnification. Thus the width always corresponds to the constant width of the printing gate. This system provides an extraordinarily easy and direct method of selecting the magnification to be used. The operator merely adjusts the level of the record gate watching the width masks which are operated automatically until the portion masked is just that desired to be printed. At this moment, the magnification is just the right one to give the constant width print desired.

Incidentally, for this adjustment it is desirable to view the original directly and hence the reflector which sends the light from the record gate to the printing gate is permitted two positions in one of which it sends the light directly from the original to the eyes of the operator.

If all records were the same shape, the length masks could be guided in the same way as the width masks and the length of the printing gate would also be fixed. However, this is not the case and shapes differ all the way from squares to relatively elongated rectangles. Means independent of the level of the record gate are provided for length masking of both gates and these masks are coupled so that the lengths at the two gates are always in the ratio of the magnification. Thus the area masked at the record gate is the area printed on the photosensitive material in the printing gate. There is another factor which must be considered in this connection, namely the magnification varies and hence the ratio between the lengths of the two gates must be similarly varied. Means are provided for varying the length masks of the record gate without varying those of the printing gate as the magnification is changed and these changes are controlled in the same way and to the same degree as the width masks. The other so-called independent means for varying the length of the record gate is the only one coupled to the length masks of the printing gate. Thus the two length masking effects desired are obtained effectively independently and do not interfere with one another. Actually the same mechanism causes both the variation in length with magnification and the variation with magnification of the relation between the rates of change in the "independent" system.

Because of the fact that the prints are to be made on rolls of photosensitive material and in order not to waste paper while making prints of different lengths the following form of length masking of the printing gate is used. The magazine carrying the rolls is moved as a whole longitudinally of the gate so that the edge of the gate next to the take-up roll acts as the mask for one end of the image. The latent image of the preceding print plus a suitable margin between prints is passed and masked off by this edge of the gate before the exposure is made. By this system, no change in the amount of paper wound onto the take-up roll is necessary when the length masks are changed and the margin between prints is always the same. The other end of the gate is masked by a movable mask which moves in and out in the opposite direction to the motion of the roll holder as a whole. With respect to the roll holder this motion is at twice the speed of the roll holder relative to the light beam. This maintains the exposed area of the printing gate centered on the optic axis of the printing beam. After each exposure the paper is advanced for controlling the advance so that only the exposed area plus a suitable margin is wound past the gate edge to the take-up roll. This controlling means is operated by the printing gate length masking means, i. e. by the movement of the printing gate and roll holder, so that the control of the advance is automatic.

With this simple masking system, the operator may, from a convenient position in front of the printer, make all the adjustments necessary for selecting the magnification and masking desired.

Other objects and advantages of the invention will be apparent from the following description when read in connection with the accompanying drawings in which.

Figure 1:
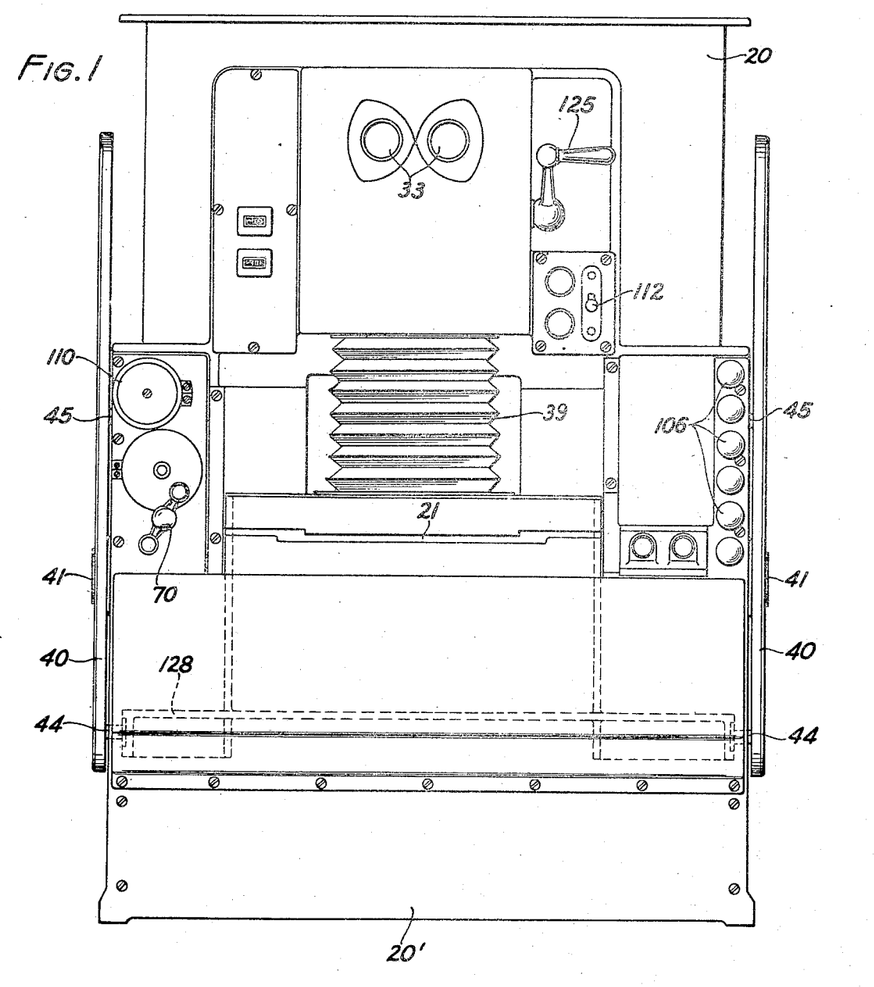
Fig. 1 shows a front elevation of the printer.
Figure 2:
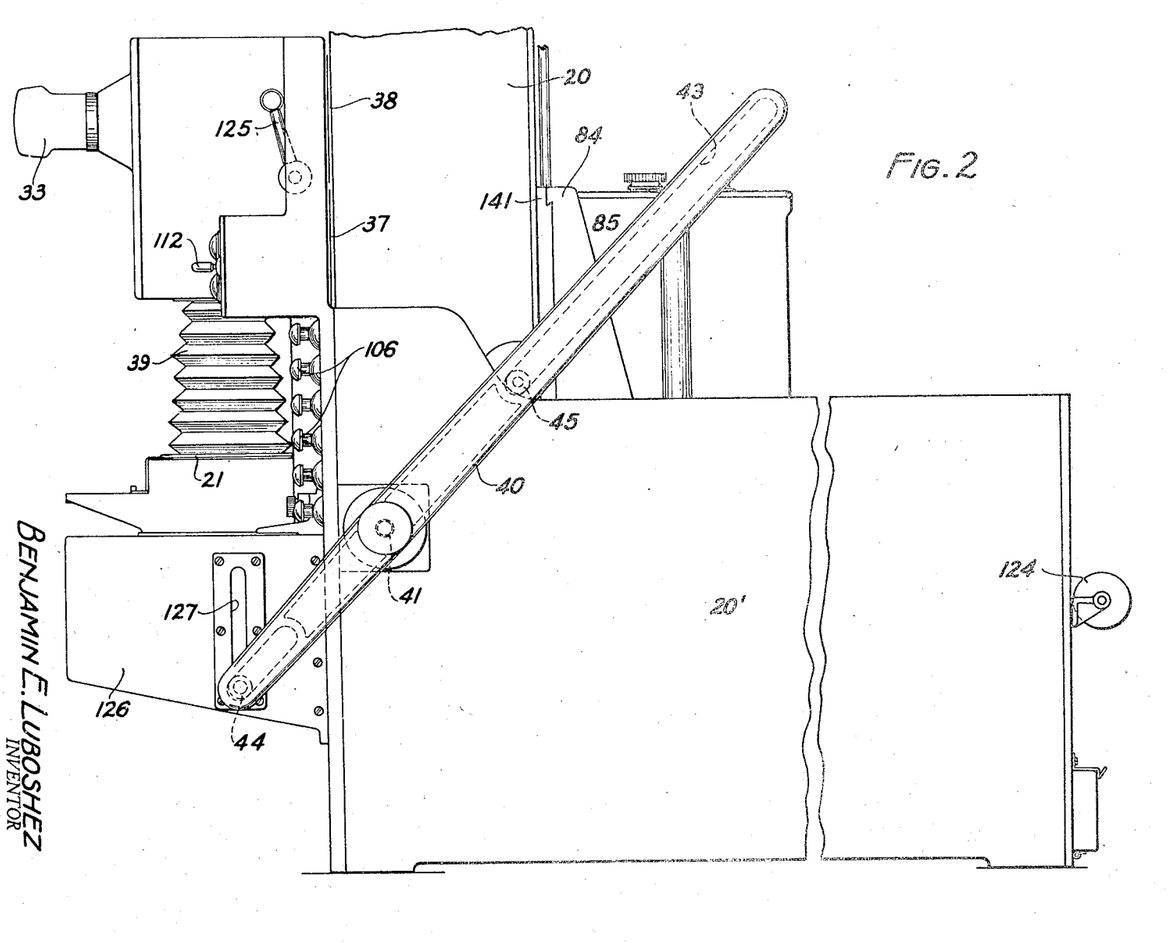
Fig. 2 shows a side elevation of the printer.

Since Figs. 1 and 2 are outside views, the cooperation of the details is not apparent therein. Therefore, the following description will be made with reference to the other figures, the optical system being shown best in Figs. 3 and 6. However, reference to the first two figures when reading the description will bring out one of the main advantages of the invention, namely the absolute convenience of all controls to the operator.

Figures 3, 4:
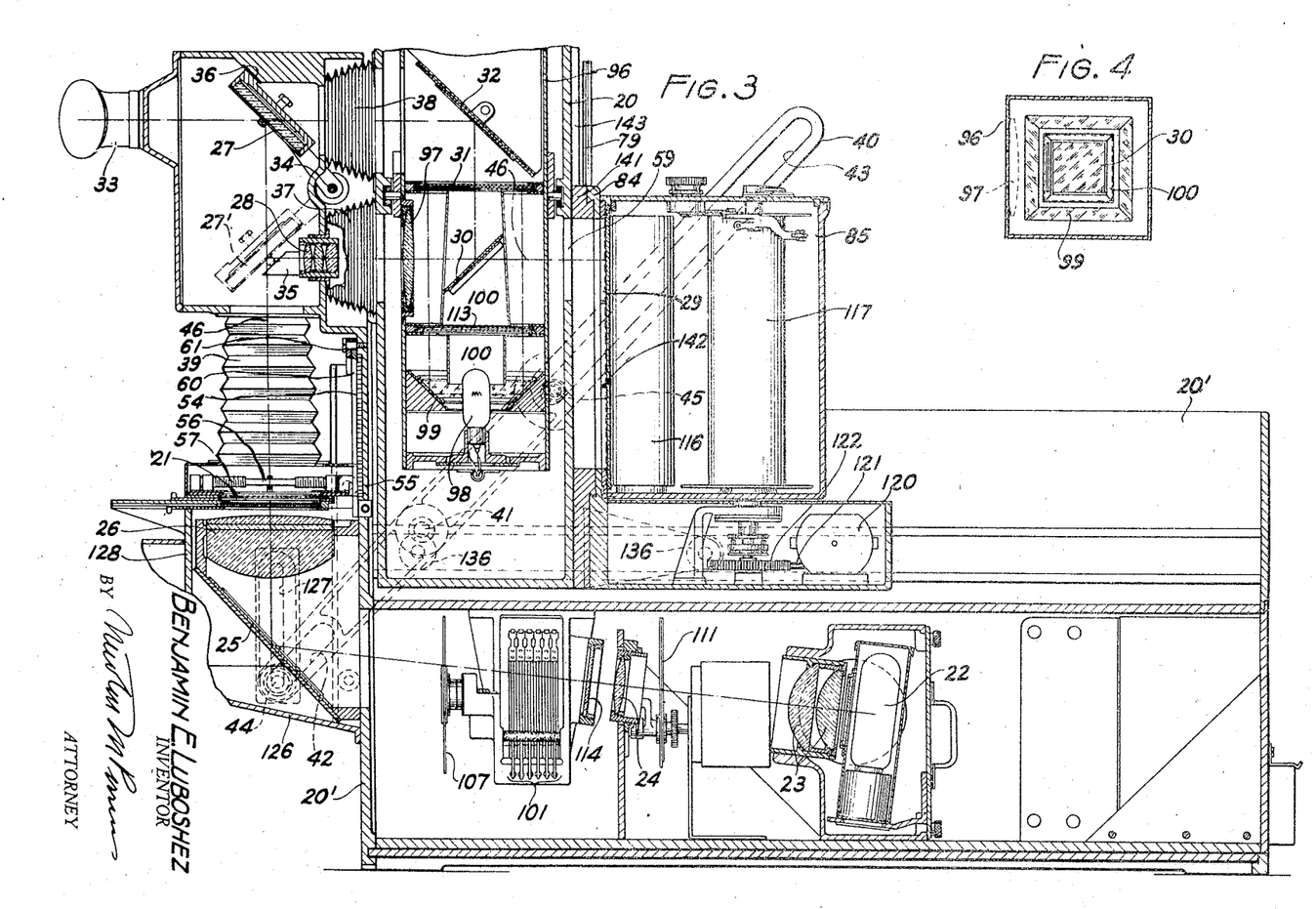
Fig. 3 shows a side elevation in cross section.
Fig. 4 shows a horizontal cross section of the viewing screen.
Figure 6:
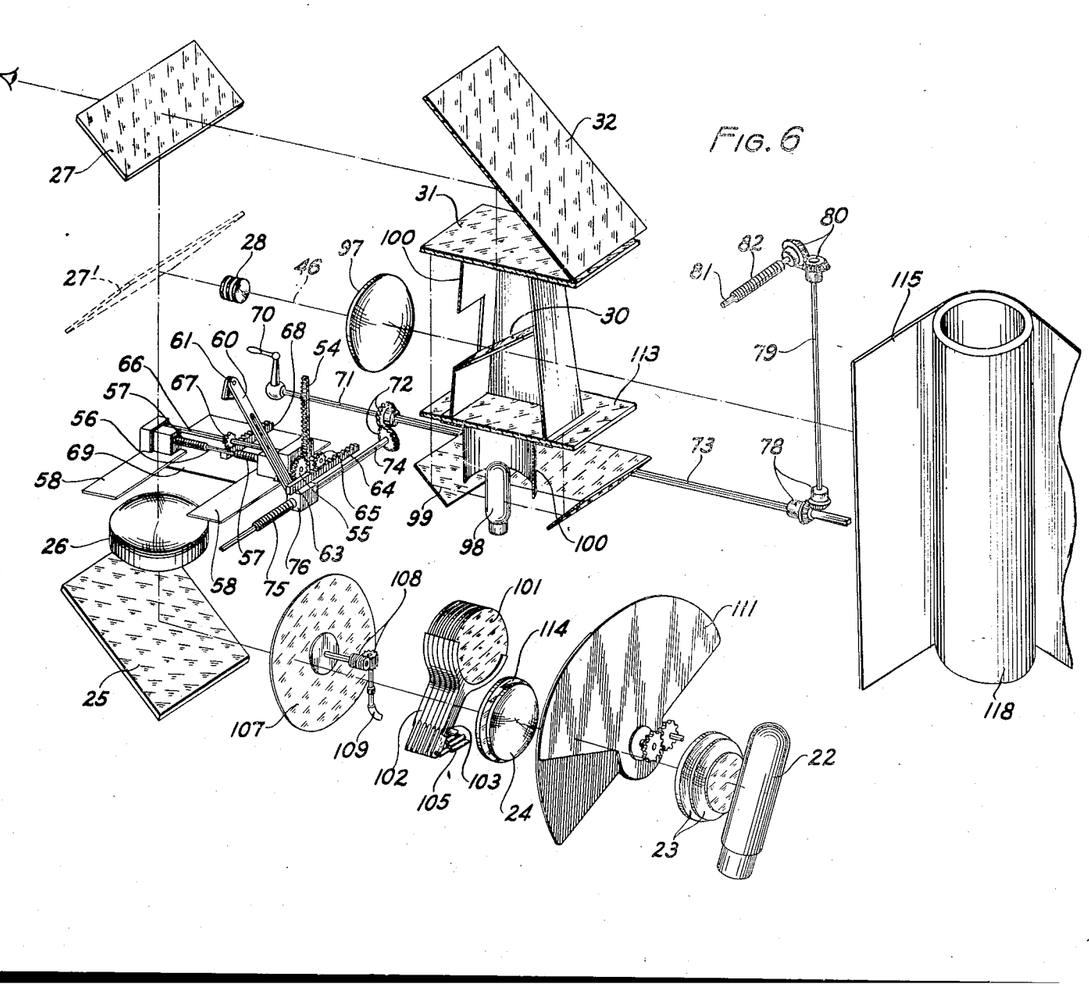
Fig. 6 is a perspective view of the optical system.

Figs. 3 and 6 will now be described together. The printer housing consists mainly of two parts—a camera 20 carried by a supporting housing 20'. The camera 20 carried by wheels 136 (in grooves 135 see Fig. 14) is movable horizontally on the supporting housing 20' and all of the features are carried directly or indirectly by these two supports 20 and 20'. Light from a lamp 22 travels in a substantially horizontal line through suitable condensers 23 and relay lenses 24 to a reflector 25 whence it is reflected vertically upward through a field lens 26 to a record gate 21 in which the original is mounted horizontally. From that point the light continues upward to a reflector 27 which is positionable in either of two positions labeled 27 and 27'. In the position 27', it reflects light through a lens 28 to a vertical printing gate 29 through a window 59 in the camera 20, back of which window 59 the sensitive paper is mounted. In the other position of the reflector 27, the light is reflected horizontally in the opposite direction through an eye-piece 33 to the eyes of the operator who may then observe the record in the record gate 21 directly. The eye-piece 33 is thus in a most convenient position above and near the record gate 21. Stops 35 and 36 are provided for limiting the movement of the mirror 27 to these two positions 27 and 27'. The hinge 34 about which the mirror 27 rotates is above the optic axis 46 as it travels through the lens 28. The mirror 27 is operated by a handle 125 (shown in Figs. 1 and 2) connected to the shaft of the hinge 34. Even if no other viewing means were present to cooperate with this one, the use of a hinged mirror alternatively to send light to the camera and to the observer simultaneously and in a very simple manner accomplishes an obviously desirable feature.

A removable mirror 30 is positioned in the path of the light from the lens 28 to the printing gate 29 so that it reflects light upward to a viewing screen 31 on which an image is formed. A reflector 32 above the viewing screen 31 permits this image to be seen in the eye-piece 33.

Figure 14:
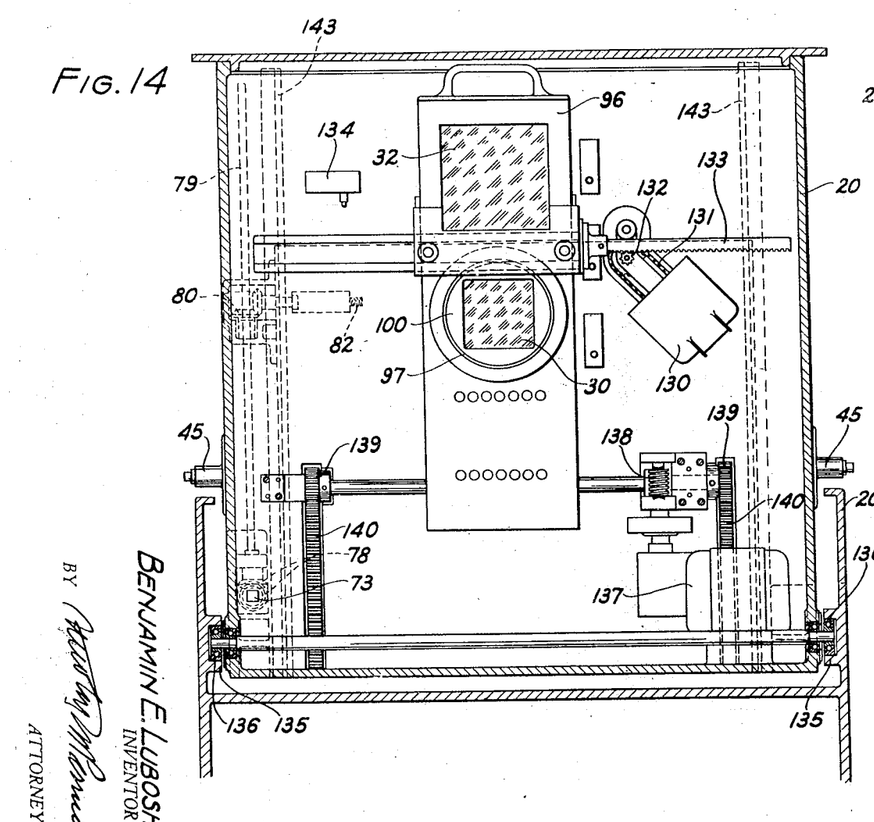
Fig. 14 is a front view of the viewing screen system.

In order to change the magnification of the print, the record gate 21 carried by a supporting member 128 is moved upward and the printing gate 29 is moved horizontally. Correct focus is maintained by means of lever 40 which rotates about a point 41 and has longitudinal slots 42 and 43 therein in which studs 44 and 45 move. The stud 44 is carried by the supporting member 128 and is constrained to move vertically in a slot 127 in the housing 126. This housing 126 for the condenser 26 is rigidly attached to the housing 20'. The stud 45 is constrained to move horizontally while the printing gate and all of the members associated therewith (i. e. camera 20) are carried by the wheels 136 moving in grooves 135 as best seen in Fig. 14.

Figure 5:
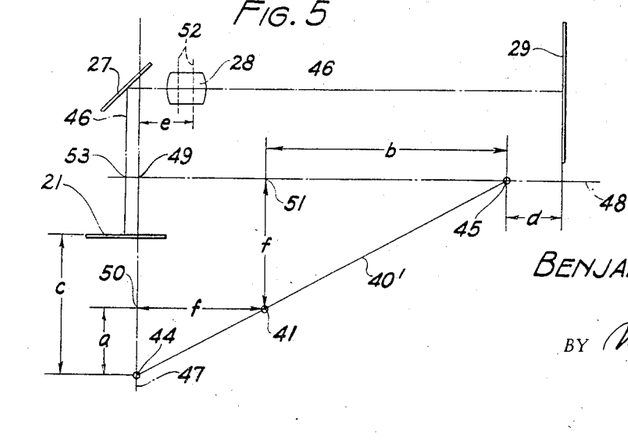
Fig. 5 is a geometrical diagram of the focusing system.

The geometry of this focusing system is best shown in Fig. 5. In this figure the vertical line of motion of the stud 44 is labeled 47 and the horizontal line of motion of the stud 45 is labeled 48. These lines of motion intersect at a point 49. Actually of course, if the lever 40 had an offset in it, the studs 44 and 45 might not have coplanar motion but in any case it would be equivalent thereto. The pivot 41 of the lever 40 is positioned a distance equal to the focal length of the lens 28 from each of these lines of motion 47 and 48. Thus the points 41, 49, 50, and 51 form a square whose side equals $f$, the focal length of the lens 28. The line 40' representing the lever 40 forms two triangles 44, 50, 41, and 41, 51, 45. It will be noted that by simple geometry these two triangles are exactly similar and remain similar to one another as the line 40' rotates about the point 41. Therefore $a:f$ equals $f:b$. That is $a \times b$ equals $f^2$. Now going over from simple geometry to optics it is known that if distances $a$ and $b$ obey this rule, the distance $a+f$ will always be conjugate to the distance $b+f$ for a lens of focal length $f$. Therefore the distance 44—49 (i. e. from 44 to 49) would always be conjugate to the distance 49—45 with respect to the lens 28. This principle is incorporated into the present printer by making the distance from the record gate 21 to the lens 28 along the optic axis 46 equal to the distance 44—49 and the distance from the lens 28 to the printing gate 29 equal to the distance 49—45. Actually the distances must be measured to the principal planes 52 of the lens 28 and that it what is meant by measuring the distance to the lens 28. As far as the optical principles of the system are concerned the lens 28 may be either side of the reflector 27. To get the above relation of distances, the distance $c$ between the printing gate 21 and its stud 44 is made exactly equal to the distance between the point 53 and the lens 28, where the point 53 is the intersection of the optic axis 46 and a horizontal plane through the horizontal line 48. Similarly the distance $e$ between the lens 28 and a plane through the vertical line 47 is made equal to the distance $d$ between the stud 45 and the printing plane 29. The planes through the lines of motion are of course the ones perpendicular to the plane of the drawing; they are in each case orthogonal to the optic axis. Although there is only one horizontal plane through the line 48 there are an infinite number of vertical planes through the line 47 and hence the term orthogonal is used to specify the planes in each case. It will be noted that the distances $d$ and $e$ are actually negative since they are measured back from the lens and from the printing gate respectively. As the record gate is moved vertically and the printing gate is moved horizontally, the distance 21—53 changes, but the distance from 21 to the lens 28 always remains equal to the distance between the stud 44 and the point 49 and the corresponding correlation is maintained with respect to the printing gate.

Figure 7:
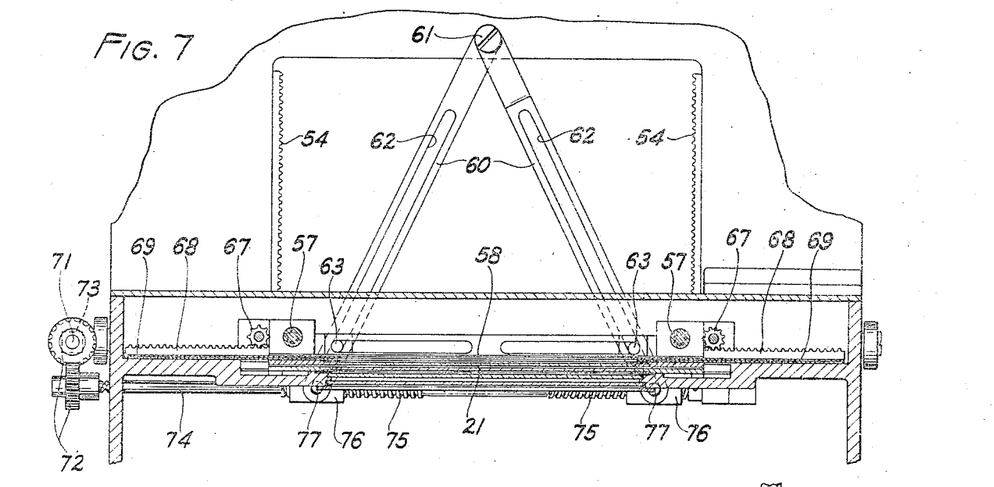
Fig. 7 is a front elevation of the record gate masking system.
Figure 8:
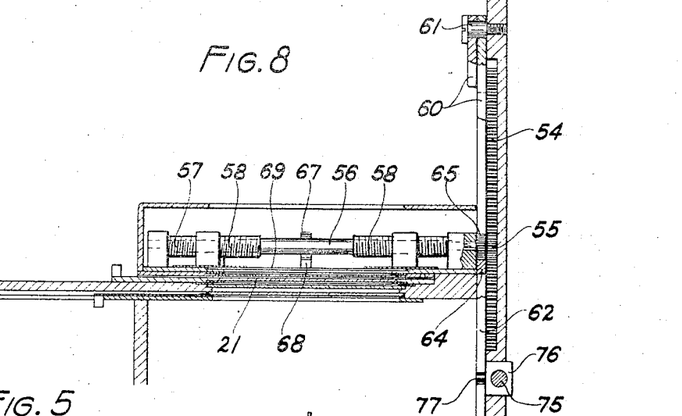
Fig. 8 is a side elevation of this record gate masking system.

The arrangement for masking the record gate is best illustrated in Figs. 6, 7, and 8. The width of the printing gate is made constant in this printer, which is, of course, the most economical method of using paper in rolls. Therefore, as the magnification is changed, it is necessary to mask the record gate (as far as the width is concerned) to a degree which is inversely proportional to the magnification. This width masking is provided by masks 58 which are moved by screws 57 carried on a shaft 56. Vertical motion of the printing gate to change the magnification causes a pinion 55 to move along a rack 54 which is held rigidly by the printer housing 20'. This pinion 55 is thus rotated and rotates the shaft 56 and the screws 57 causing the mask 58 to move in and out as the printing gate is moved up and down.

The length masking of the record gate is more complicated by the fact that different shaped records are often to be printed. The length masking operation may be divided into two parts, that which must follow the change in magnification in the same way that the width masking does and that which is somewhat independent of the magnification and depends mainly on the shape of the record being printed. Adjacent to the record gate are provided two arms 60 which are pivoted at a point 61 which is rigidly fastened to the printer housing 20'. These arms 60 carry longitudinal grooves 62 therein in each of which moves two studs 63 and 77. The studs 63 are carried by racks 64 which move with the record gate. Thus as the record gate moves up, the stud 63 moves along the groove 62 pulling the horizontal rack 64 with it. This motion of the rack 64 causes a pinion 65 to rotate which rotates its shaft 66 and another pinion 67 thereon, which other pinion moves a rack 68 horizontally causing the length masks 69 to move in. Thus for successive prints of records of the same shape but different sizes, different magnifications are obtained by vertical motion of the record gate and both the width and length masking of this gate move in accordance with the change in magnification.

In this general connection, attention is drawn to the fact that the magnification necessary is very easily selected by the operator when viewing the record directly, i. e. when the rotatable reflector is in the position 27. The operator merely has to raise or lower the horizontal record gate until the automatic masking of the width of this gate is brought to the area desired at which time the focus and magnification are exactly that to give a print of the fixed width being made. That is, the operator merely selects the width of the record to be printed and the necessary magnification is automatically assured.

When prints of different shape are used, the length masks have to be changed independently of the width masks. For this purpose a crank 70 rotates a shaft 71 and gears 72 which in turn rotate a shaft 74 having screw threads 75 thereon. These screw threads 75 cause nuts 76 to move horizontally carrying the stud 77 referred to above. This horizontal movement of the stud 77 causes the arm 60 to rotate about the pivot 61, the stud 77 moving a short distance along the groove 62. This movement of the arm 60 causes the other stud 63 to move carrying the rack 64 and moving the length mask 69 in the same way as before. It will be noted that the stud 77 moves only horizontally with respect to the printer whereas the stud 63 moves vertically with changes in magnification. Thus the correlation between the horizontal movement of the stud 77 and the movement of the mask 69 is always modified by the magnification factor. When a high degree of magnification is being used, the record gate is very high and the studs 63 are high in the grooves 62 and close together. In this case a relatively large horizontal movement of the stud 77 is required to give a relatively small change in the length masking.

Figures 9, 10:
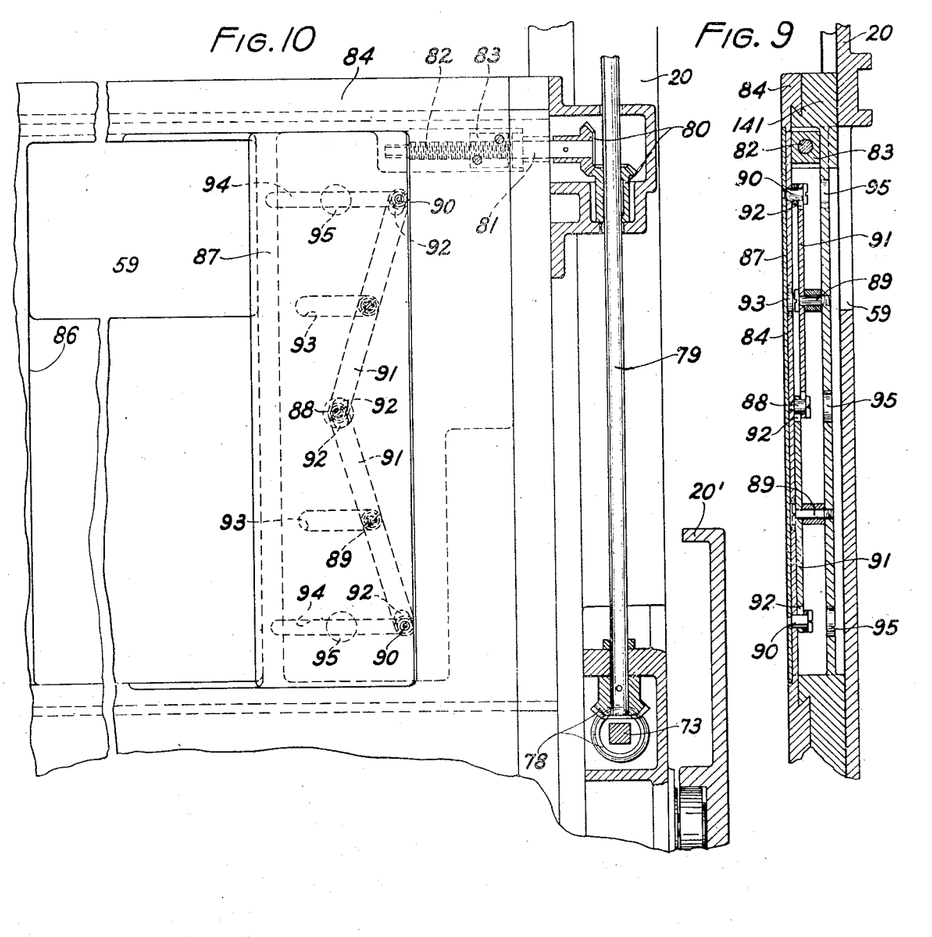
Fig. 9 is a side elevation of the printing gate masking system.
Fig. 10 is a rear elevation of the printing gate masking system.
Figure 11:
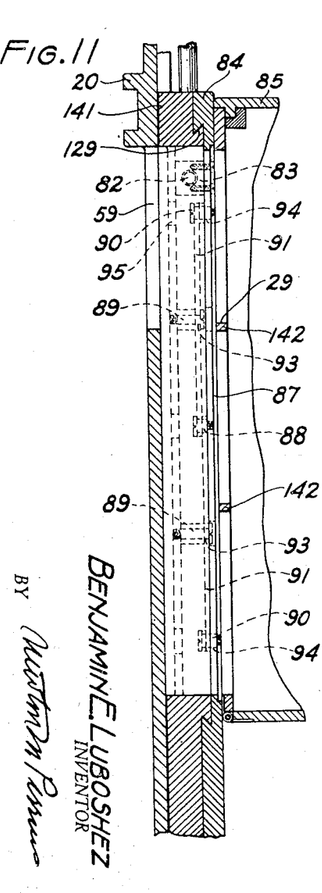
Fig. 11 is another side elevation, opposite to that of Fig. 9, of the printing gate masking system.
Figure 13:
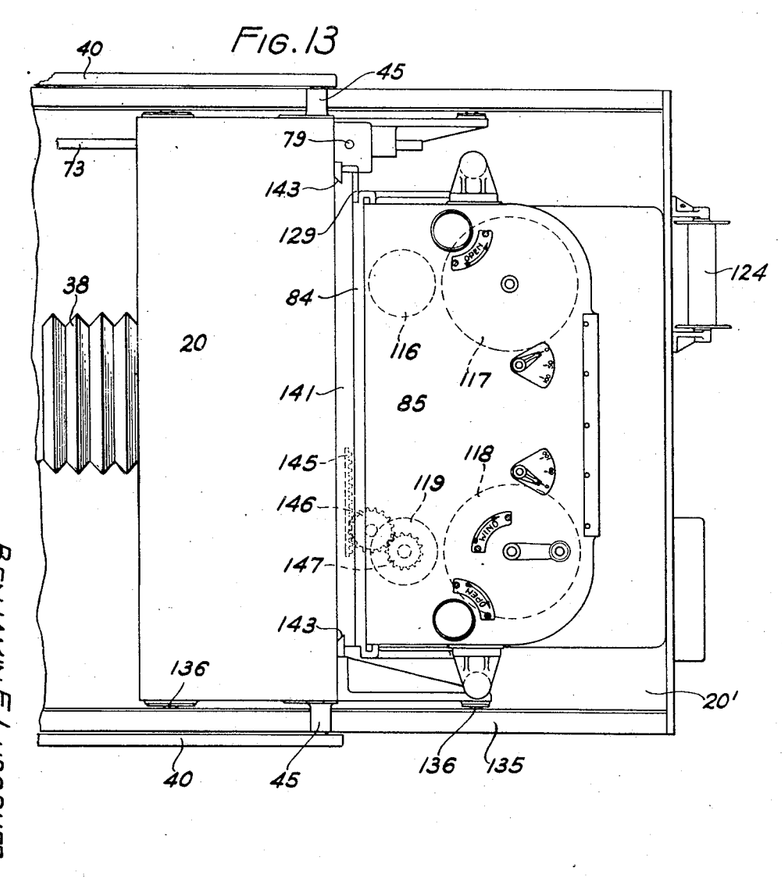
Fig. 13 is a top view of the roll holder for the printing paper.

The shaft 71 which is rotated by the crank 70 has a square portion 73 extending back toward the printing gate. This square portion carries a set of bevel gears 78 which can move along the shaft 73 as the magnification is changed, but which in any position will be rotated by rotation of this shaft 73. These gears 78 in turn rotate a shaft 79 and another set of gears 80 which operate through a shaft 81 and screw threads 82 to change the length masking of the printing gate. The length masking of the printing gate 29 as formed by the plate 84 is best shown in Figs. 9, 10, and 11. In these figures the plate 84 has an aperture therein which in part constitutes the printing gate. Actually the top and bottom edges of the printing gate and hence its width is defined by the front plate of a roll holder 85 which carries the paper and is carried by the plate 84. In the arrangement shown the roll holder 85 can be used successively in three positions so that three strips of pictures may be made. The edges of the printing gate between the three positions are defined by strips 142 extending across the aperture in the roll holder. One end of the printing gate 29 is defined by the edge 86 of the aperture in the plate 84. As the length masking crank 70 is rotated causing rotation of the screw thread 82, the whole plate 84 carried by a nut 83 operating on the screw 82 is moved horizontally. The plate 84 is carried by a groove 129 and moved in this groove only a relatively small distance as is best seen in Fig. 13.

The other end of the printing gate is defined by a movable mask 87 carried by the plate 84. As the plate 84 is moved by the screw 82 and nut 83, it carries with it a pivot 88. This pivot 88 acts as the common point for two connected levers 91 which are pivoted at the points 89. These points 89 are rigid with respect to a plate 141 which in turn is rigid with respect to the camera housing 20 as far as any horizontal motion is concerned. The other ends of the levers 91 carry pivots 90 which are fastened to the mask 87. Suitable slots 92 are provided in the levers 91 for longitudinal motion of the pivots 88 and 90. Slots 93 are provided in the plate 84 to permit assembling of the pivots 89 and to permit movement of the plate 84 with respect to these pivots, especially in the case of the pivot which extends into this plate by reason of the fact that one of the levers 91 is on top of the other and is immediately adjacent to the plate 84. Slots 94 are provided in the plate 84 to permit the pivots 90 to extend through from the mask 87 to the levers 91 which are on the opposite side of the plate, and to permit these pivots 90 to move with respect to the plate 84. Holes 95 are provided in the plate 141 to permit assembly of the pivots 88 and 90.

As the plate 84 moves in one direction carrying the edge 86 with it, the mask 87 moves in the opposite direction with the same speed with respect to the plate 141 and the printer housing 20. It will be noted that the movement of the mask 87 with respect to the plate 84 is at twice the speed of the movement of the plate 84 with respect to the plate 141. Thus the light to the printing gate passes through the window 59 in the camera housing 20, the top and bottom of the gate are formed by the roll holder 85 with its cross strips 142 and the ends of the gate are formed in the adjacent plate 84 by edge 86 and mask 87.

Referring back to Fig. 3 particularly with reference to Figs. 4, 14, and 15, the viewing system will now be described.

The movable mirror 30 is carried by a housing 96 in the front of which is a window to admit light from the lens 28. A lens 97 positioned in this window reduces the size and increases the brilliance of the image on the viewing screen 31 with respect to the image which, in the absence of the reflector 30 reaches the printing gate 29. Around this image on the viewing screen 31 are provided borders which are illuminated by white light by means of a lamp 98 positioned behind the mirror 30. Light from this lamp 98 is reflected by an inverted four-sided pyramid mirror 99 upward to the borders of the viewing screen 31. It is of course desirable to prevent any light from this lamp 98 reaching the image on the screen 31 and for this reason suitable baffles 100 are provided. If one were to remove the viewing screen 31 and to look down from this point, one would see an arrangement such as that shown in Fig. 4 wherein the central area consists of the mirror 30 surrounded by sloping baffles 100 having a window in one side thereof which baffles are surrounded by the mirror 99 and the viewing system housing 96. The lens 97 is shown by broken lines in this figure. The arrangement is also very well shown in the perspective view in Fig. 6.

Figure 12:
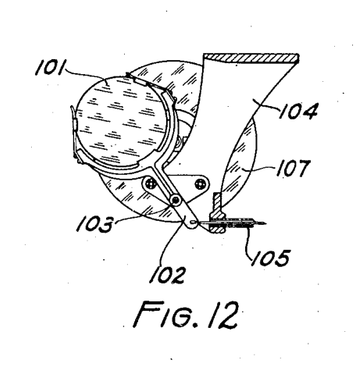
Fig. 12 is an end view of the filter holding device.

While the operator is viewing this image on the viewing screen 31, the white border there around makes it very easy for him to detect any discrepancies in the color balance of the original which is in the printing gate 21. For example, an original may be slightly too green, but viewing it separately it would not show up this defect because the eye would adapt itself, whereas the overall green appearance is exaggerated by the presence of a pure white border and hence the operator is made definitely aware of even the slightest discrepancy. By means of various color filters 101 in the optical system somewhere between the lamp 22 and the removable mirror 30, preferably between the lamp 22 and the record gate 21, the overall hue of the record is changed until it has the correct color as compared to the white border of the viewing screen 31. As shown in Fig. 12, these filters are mounted on individual handles 102 pivoted on a bar 103 which is supported by an arm 104 connected to the printer housing 20'. The movement of these filters 101 is controlled by individual flexible cables 105 connected to buttons 106 shown in Figs. 1 and 2.

For two reasons, namely for most convenient comparison of color and in order to permit exposure of a fixed time it is also desirable to vary the density of the image striking the printing gate, and correspondingly the density of the image on the viewing screen 31. For this purpose a density wedge 107 as best seen in Fig. 6 is positioned in the light beam and is operated by gears 108 through a rotatable flexible shaft 109 which is connected to a dial or knob 110 shown in Fig. 1. Thus the filters 101 and the density wedge 107 are used to correct for errors in color balance in the original transparency and in the light source 22 and for variations in intensity of the image striking the printing gate.

In a color printing system of this type there is another source of possible error in color balance which can be corrected for. I refer to the fact that the sensitivity of the color sensitive paper on which the print is to be made, may vary somewhat from the correct value. From a theoretical point of view there are two ways of considering this effect. Since the white borders on the viewing screen 31 are used to define what is the correct hue of the pictures which strike the printing gate, the color of the light from the lamp 98 must be that for which the sensitivity of the printing paper is balanced. To provide for variations of sensitivity balance, a filter 113 corresponding to the sensitivity of the particular roll of paper to be used is placed in the path of the light from the lamp 98 to the borders of the viewing screen. Because of the adaptation of the human eye, the borders of the viewing screen will still be considered to be white and a balance of the color of the image appearing thereon until it appears correct with respect to this white, may be made. At such a time, the image striking the viewing screen 31 (hence the image striking the printing gate 29 when the removable mirror 30 is removed) will have the correct hue to give correct color balance on the particular sensitive paper used. In order to insure that correct color balance can be easily obtained with the filters 101 even when the filter 113 is in place, a filter 114 identical in spectral transmission to the filter 113 is positioned adjacent to the filters 101. Of course this is necessary only if the filters 101 do not cover a sufficient range to provide the correct color hue when the filter 113 is in place. That is, the filters 101 are usually made to cover only the range variations in hue of transparencies and may not extend to a range including variations in color balance of the sensitive paper.

Looking at this subject from another point of view, the filter 114 which is selected to correspond to the sensitivity of the paper being used is placed in the illuminating system at the time prints are being made. If this filter 114 can be easily removed during the judging, and replaced while the exposure is being made on the printing gate 29, only one filter will be needed. However since the filter 114 has to stay in place and is not changed during the whole of one roll of sensitive paper, it is decidedly inconvenient to have to remove this filter between the exposures in order to prevent it interfering with the balancing out of discrepancies in the color balance of the original transparency. Therefore, the filter 114 is placed permanently in place and the filter 113 is placed in the illuminating system that gives the white borders on the viewing screen 31 whereby the effect of the filter 114 on the color balance of the original is balanced out. That is, either or both of the filters 113 and 114 are necessary, but both are preferable since if 114 only is used, it must be removed from the optical system during judging and if filter 113 only is used, the filters 101 may not have sufficient range to compensate for the effect of the filter 113.

A suitable shutter 111 is provided in the optical system and is arranged so that it may be held open during masking and judging, held closed while the viewing system carried by the housing 96 is removed from the optical system and operated once giving a fixed exposure. As shown in Fig. 6, the shutter 111 is provided with an adjustable sector to vary the amount of the exposure in the well-known way. The shutter 111 is operated preferably electrically by a button 112 shown in Fig. 1.

In Fig. 13, the paper holding means is illustrated from above. As pointed out above the camera housing 20 carries a plate 141 which is constrained to move in vertical grooves 143 to permit different strips of the roll of paper to be used. This plate 141 has a horizontal groove 129 on which plate 84 carrying the printing gate moves under the action of the screw 82 which forms part of the length masking system. This plate 84 carries the roll holder 85 in which are located the supply roll 117 and the take-up roll 118 carrying the sensitized paper 115. Rollers 116 and 119 adjacent to the printing gate plane guide the paper through this plane. As far as the printing gate is concerned roller 116 constitutes the supply roll and roller 119 constitutes the take-up roll.

So that no paper will be wasted, the take-up mechanism is arranged so that after each exposure the area exposed plus a slight and fixed margin between prints is moved past the printing gate and onto the take-up system. Since according to the invention one side of the printing gate acts as the mask for one end of that gate, the amount of paper on the take-up roll does not have to be moved even though the length masks are changed. This is, of course, the reason for having one end of the printing gate fixed and having a double speed mask operating over the other end. The so-called fixed end of the printing gate is the one next to the take-up roll. Means are provided for assuring that the amount of the paper advanced after each exposure will be just exactly that necessary to bring the exposed area plus a suitable margin past the gate independent of the length of that exposed area.

Figure 16:
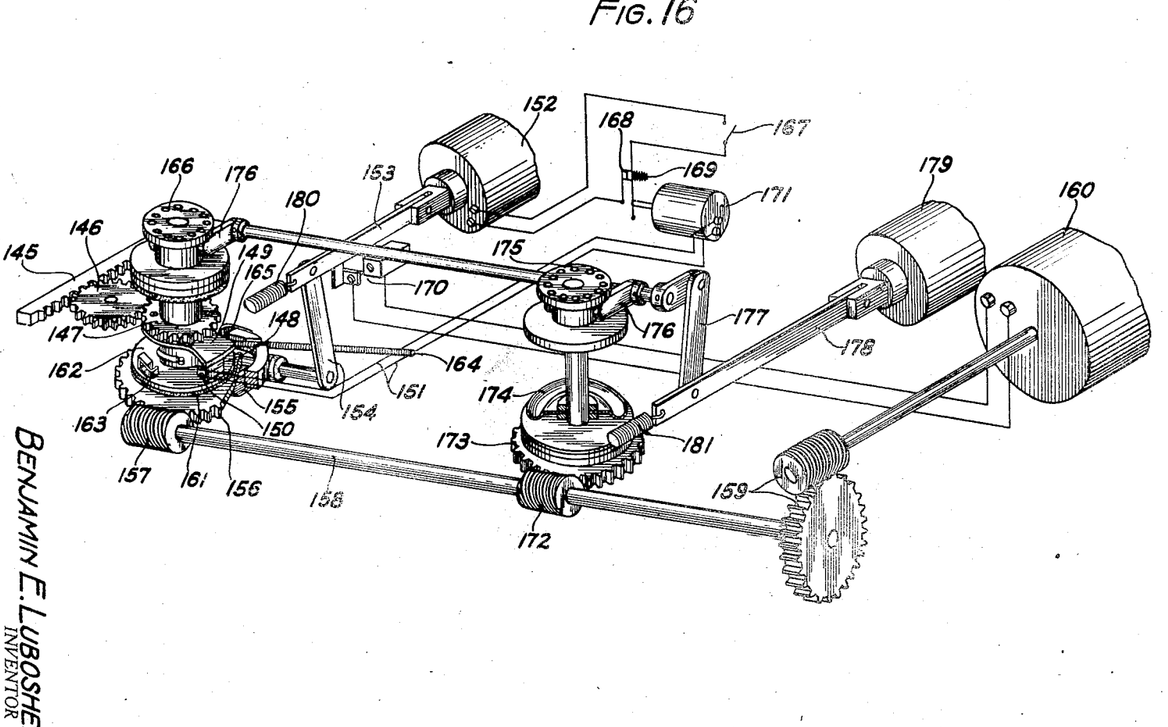
Fig. 16 is a perspective view of the paper advancing mechanism.

This paper advancing system is best explained with reference to Fig. 16 which illustrates the driving mechanism which forms part of the paper holding system 85. At this point, attention is drawn to the fact that in the cross section shown in Fig. 3 only the rewind mechanism consisting of motor 120, shaft 121, and clutch system 122 for operating the supply roll 117 as a take-up roll during rewinding is shown. The take-up system shown in Fig. 16 is similarly fixed below the rollers 118 and 119. Since the actual take-up roll 118 cannot conveniently be used for controlling the exact amount of paper taken up (the amount taken up depends on the diameter of the roll and how much paper has already been wound thereonto) the roller 119 is used as the driving roller and is accurately controlled. The roller 119 is driven by studs thereon extending into the plate 166 and the take-up roll 118 is driven by studs thereon extending into the plate 175. Normally the switch 168 is closed by a spring 169. Hence when the switch 167 is closed in order to advance the paper, a solenoid 152 pulls the core 153 against the force of a spring 180 causing a switch 170 to close and a lever arm 154 to rotate pawls 155 upward. The closing of the switch 170 starts the motor 160 which, through the gears 159, shaft 158, and worm gear 157 causes a gear 156 to rotate. The pawls 155 push this gear upward so that through a friction drive 161 the wheel 166 starts to rotate. On the same shaft, there is mounted a rotatable plate 162 which under the force of the friction drive, rotates carrying an electrical contacting member 163 with it. When this rotation proceeds far enough, the contacting member 163 engages contacts 150 mounted on a stud 148. Through wires 151 the closing of this contact 150 causes a solenoid or relay 171 to operate and open the switch 168 which turns off the solenoid 152 releasing the switch 170 and the pawls 155 stopping further operation.

Thus the friction drive 161 is released and under the action of a spring 164 the plate 162 carrying the contacting member 163 is drawn rapidly back to its original position wherein the member 163 is against a back stop 165. Obviously the position of the contacting post 148 carrying the contacts 150 determines how far the wind-up operations will proceed before being cut off. This contacting post 148 is carried by an arm 149 mounted on a gear 147 which is free to rotate on the shaft of the driving system. This gear 147 is adjusted through a pinion 146 which moves on a rack 145 which, as shown in Fig. 13 is mounted on the plate 141 which is horizontally fixed with respect to the camera housing 20. The pinion 146 is carried by the printing gate plate 84 and hence as this gate 84 is adjusted for length masking, the pinion 146 moves along the rack 145 and at the same time turns the gear 147 adjusting the position of the contacting stop 148. Thus this driving system constitutes means for accurately advancing the paper by an amount equal to the exposed area plus a suitable margin between prints. The actual take-up roll 118 is driven by the same motor 116 through gears 172 and 173 and the roll engaging member 175. Since this must be a slip drive to compensate for changes in diameter of the paper roll, a spring 174 is provided and the driving is done through this spring.

For rewinding, it is necessary to release the engagement between the rollers 118 and 119 and the driving wheels 166 and 175 respectively. This is done by a solenoid 179 whose core 178 is moved against a spring 181 causing the crank 177 to turn which in turn moves pawls 176 downward releasing the engagement between the driving wheels and the rolls as required.

Figure 15:
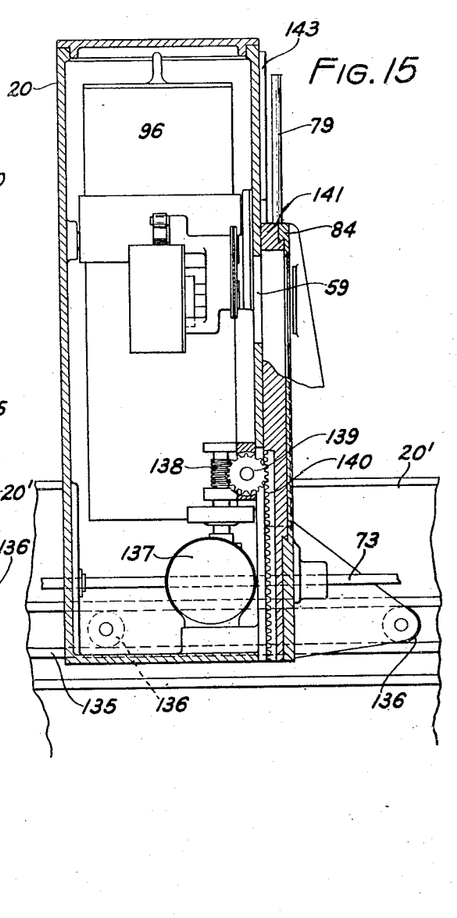
Fig. 15 is a side view of the viewing screen system.

The mechanical details of the viewing system are shown in Figs. 14 and 15. The viewing housing 96 carrying the mirrors 30 and 32 and the baffles 100 and lens 97 is positioned to move horizontally on suitable guides and is driven by a rack 133 and pinion 132. This pinion 132 is driven by a chain drive 131 by a motor 130. As the housing 96 moves completely out of the optical path an electric switch 134 is operated to shut off the motor 30 to prevent any further motion. As best shown in Figs. 1, 2, and 3 bellows 39 are provided to permit vertical motion of the record gate 21 and bellows 37 and 38 permit horizontal movement of camera 20 relative to lens 28 and eye-piece 33.

These Figs. 14 and 15 also illustrate the device for raising the plate 141 in the grooves 143. For this purpose racks 140 are mounted on the plate 141 and are driven by a motor 137 through suitable gears 138 and pinions 139.

These figures also illustrate the position of the focusing studs 45 and the wheels 136 upon which the whole camera mechanism 20 is mounted to move in grooves 135 in the printer housing 20'. This motion of camera 20 relative to the support 20' requires that some provision be made for the wire carrying current to the motors 120 and 160 etc. The wires (not shown) are held in the housing 20' and fed out over a roller 124 mounted on the rear thereof and back to the motors in the camera 20.

The method by which the above device satisfies each of the specific objects of the invention will now be outlined. The record gate 21 is horizontal and is very convenient for manipulation when the operator is viewing through the eyepiece 33. The weight of the camera system 20 with the roll holder 85 does not affect the focusing since the focusing requires only a horizontal movement of this heavy unit on a horizontal track. There is no waste of paper laterally of the roll because the prints are of constant width. This is true whether a single strip or three strips of pictures are made on each roll. The selection of the correct magnification depends merely on the selection of the correct width of the mask of the original record. Changes in the length masking of the original are coupled to the magnification system so that the relative rate of changes in the length masking of the printing and record gates is always proportional to the magnification and the masking of the record gate separately changes with the magnification even when the shape of the original to be printed is the same. The paper advancing means permits the use of paper in rolls and the control means on the rate in which this paper is advanced eliminates any waste of paper.

Since optically the magnification by any lens is inversely proportional to the distance of the object plane from nearer focal point of the lens, the position of the pivotal point 61 must be optically equivalent to the front focal point of the lens 28. Thus, when the record gate 21 is a distance equal to $f$ below the pivot 61, the magnification must be one to one. If the record gate 21 could be moved right up to the pivot 61 the magnification would have to be infinite since this is the front focal point of the lens. That is, the common point 61 is in the same horizontal plane as the front focal point of the lens 28. This principle is the same whether or not the common point 61 is a pivot to permit the use of different shaped originals and is equally applicable to width masking.

Having thus described my invention, I wish to point out that it is not limited to the specific structure shown, but is of the scope of the appended claims.

What I claim and desire to secure by Letters Patent of the United States is:

1. A projection printer for making prints of one width from transparent photographic records of different widths comprising a horizontal gate for holding a record, means for illuminating the record from below, a vertical gate of constant width for holding photosensitive material upon which prints are to be made, a reflector and a lens above the record gate for focusing an image of the record in the vertical gate, means for moving both gates relative to the lens and reflector for varying the magnification, lever means coupling the two gates for automatically maintaining focus as the gates are moved, width masking means on the record gate, and means operated by the movement of this gate for adjusting said width masking means and maintaining it at a width equal to said constant width divided by the magnification.

2. A projection printer according to claim 1 comprising length masking means on the record gate adjustable independently of the vertical movement of this gate, length masking means on the vertical gate and means coupling these two length masking means to maintain the masked lengths in a ratio equal to the magnification.

3. A projection printer according to claim 1 comprising a vertical roll holder for sensitive material adjacent to said vertical gate, means for moving the roll holder and vertical gate horizontally and transverse to the light from the lens and reflector for masking the image lengthwise from one end, an adjustable mask mounted at the other end of the gate and means operated by the gate movement for moving this adjustable mask in the opposite direction to the movement of the gate and at twice the speed thereof relative thereto whereby both ends of the image are simultaneously and equally masked, length masking means on the record gate adjustable independently of the vertical movement of this gate, and means coupling this length masking means to said roll holder moving means to maintain the ratio of the masked length of the image to the masked length of the record equal to the magnification of the image.

4. A projection printer according to claim 1 comprising length masking means on the record gate, means operated by the movement of this gate for adjusting said length masking means in accordance with the magnification, means independent of said movement also for adjusting said length masking means, length masking means on the vertical gate and means coupling the vertical gate masking means to said independent adjusting means for maintaining the masked lengths of the image and record in a ratio equal to the magnification whereby as the magnification is altered, the image length masking means remains fixed, the record length masking means varying inversely with the magnification and as the record length masking means is varied independently of the magnification, the image length masking means varies similarly.

5. A projection printer for making prints from transparent photographic records comprising a record holding gate, a constant width gate for holding photosensitive material upon which a print is to be made, lens means for focusing an image of the record gate on the print gate, means for moving the gates relative to the lens to give different magnification, means coupling the gates for automatically maintaining correct focus as the magnification is changed, width masking means for the record gate and means operated by the movement of this gate for adjusting the masking linearly inversely proportional to change in magnification whereby correct magnification may be obtained by varying it until the width of the record is correct.

6. A projection printer for making prints from transparent photographic records comprising a record holding gate, a gate for holding photosensitive material upon which a print is to be made, lens means for focusing an image of the record gate on the print gate, a roll holder adjacent to the print gate for feeding photosensitive material past the gate lengthwise of the image, a supply roll and a take-up roll in the roll holder at opposite ends of the gate, means for moving the print gate and the roll holder lengthwise of the image whereby the masking by the print gate of the end of the image adjacent to the take-up roll is adjusted, an adjustable mask mounted on the other end of the print gate and operated by the moving of the print gate in the opposite direction and at twice the speed of this latter moving whereby the masking of the end of the image adjacent to the supply roll is simultaneously and similarly adjusted, means for advancing photosensitive material from the supply roll to the take-up roll between the making of successive prints and means operated by the moving of the print gate for limiting said advancing to the length of the print just previously made plus a margin between prints.

7. A projection printer according to claim 1 comprising length masking means on the record gate, means operated by the movement of this gate for adjusting said length masking means in accordance with the magnification, means independent of said movement for adjusting said length masking means, a roll holder adjacent to said vertical gate for feeding photosensitive material past the gate lengthwise of the image, a supply roll and a take-up roll in the roll holder effectively at opposite ends of the gate, means for moving this vertical gate and roll holder lengthwise of the image whereby the masking by the print gate of the end of the image adjacent to the take-up roll is adjusted, an adjustable mask mounted on the other end of the vertical gate and operated by said moving of the vertical gate lengthwise in the opposite direction and at twice the speed of this latter moving whereby the masking of the end of the image adjacent to the supply roll is simultaneously and similarly adjusted, means coupling the means for moving the vertical gate lengthwise of the image and said independent adjusting means for maintaining the masked lengths of the image and the record in a ratio equal to the magnification whereby as the magnification is altered, the image length masking means remains fixed, the record length masking means varying inversely with the magnification and as the record length masking means is varied independently of the magnification, the image length masking means varies similarly, means for advancing photosensitive material from the supply roll to the take-up roll between the making of successive prints and means operated by the moving of the print gate for limiting said advancing to the length of the print just previously made plus a margin between prints.

8. A projection printer for making prints from transparent photographic records comprising a record holding gate, a constant width gate for holding photosensitive material upon which a print is to be made, lens means for focusing an image of the record gate in the print gate, a housing for the gates and lens, means carried by the housing for moving the record gate and means carried by the housing for moving the print gate both relative to the lens for changing the magnification, width masking means on the record gate operated by the motion of this gate relative to the housing for masking this gate linearly inversely proportional to the magnification, length masking means on the print gate, length masks on the record gate, means for adjusting the record length masks in accordance with the magnification and in accordance with the print gate length masking means, said adjusting means consisting of two longitudinally slotted arms pivoted in common at one end of each to the housing adjacent to the record gate said arms being at an angle to one another and in a plane lengthwise of the record gate substantially at right angles to the plane of this gate, a pair of pins carried by the gate and in the slots in said arms whereby the pins move toward or away from each other as the record gate is moved toward or away from the common pivot, means coupling said pins to said record length masks for moving the latter as the pins are moved, a second pair of pins in said slots and adjustable relative to one another for varying the angle between said arms and means coupling this second pair of pins to the print gate length masking means for simultaneously adjusting both, whereby as the print gate length masks are adjusted, the record gate length masks are proportionally adjusted, the proportionality factor being varied as the record gate is moved relative to the housing.

9. A projection printer for making prints from transparent photographic records comprising a record holding gate, a constant width gate for holding photosensitive material upon which a print is to be made, lens means for focusing an image of the record gate on the print gate, a support for the lens, means carried by the support for axially moving the gates relative to the lens to give different magnifications, means coupling the gates for automatically maintaining correct focus as the magnification is changed, width masking means on the record gate, means operated by the movement of this gate for adjusting the width masking linearly inversely proportional to the magnification, length masking means on the record gate and on the print gate, means for simultaneously and proportionally adjusting these length masking means and means operated by the movement of the gates for maintaining the proportionality factor in this length adjustment equal to the magnification.

10. A projection printer according to claim 9 in which the means for adjusting the length masks on the record gate includes two longitudinally slotted arms pivoted in common at one end of each to the support adjacent to the record gate said arms being at an angle to one another and in a plane lengthwise of and perpendicular to the record gate, a pin in each slotted arm which pins move in the slots toward and away from each other as the record gate is moved for changing magnification, means operated by the pins for proportionally adjusting the length masks as the pins so move, means including another pin in each slotted arm for adjusting the angle between the arms and means operatively coupling this angle adjusting means to said means for simultaneously adjusting the length masking means.

11. A projection printer according to claim 9 in which is included a roll holder carried by the print gate, having an aperture adjacent to the print gate, a supply roll and a take-up roll in the roll holder for holding the photosensitive material, means for feeding the photosensitive material from the supply roll to the take-up roll through the print gate, means for moving the roll holder transversely to the optic axis of the light from the lens, the end of said aperture adjacent to the take-up roll acting as one of the length masks of the print gate and a mask carried by the roll holder at the other end of said aperture, said length masking means for the print gate consisting of the means for transversely moving the roll holder and means for simultaneously moving the mask in the opposite direction at the same speed relative to the support.

12. A projection printer according to claim 8 in which the common pivot for said two slotted arms is in the plane orthogonal to the optic axis of the lens at the focal point thereof nearer said record gate.

13. A projection printer according to claim 9 in which the means for adjusting the length masks on the record gate includes two longitudinally slotted arms pivoted in common at one end, the pivot being in the plane orthogonal to the optic axis of the lens at the focal point thereof nearer the record gate, said arms being at equal angles to a plane through the optic axis and said pivot, pins carried by the record gate and moving in the slots in said arms as the record gate is moved axially and means operated by the motion of the pins toward and away from each other for adjusting said length masks.

14. A projection printer for making prints from transparent photographic records comprising a record holding gate, a constant width gate for holding photosensitive material upon which a print is to be made, lens means for focusing an image of the record gate on the print gate, a support for the lens, means carried by the support for axially moving the gates relative to the lens to give different magnification, means coupling the agtes for automatically maintaining correct focus as the magnification is changed, width and length masking means on the record gate, at least one of said masking means consisting of transversely movable masks, two pins carried by the record gate movable toward and away from one another and operatively connected to the masks for adjusting them linearly in accordance with this motion toward and away from one another, longitudinally slotted arms each engaging one of the pins, said arms being in a plane substantially parallel to the optic axis of the lens, having a common point carried by the lens support in a plane orthogonal to the optic axis of the lens at the focal point thereof nearer the record gate and being at equal and opposite angles to a plane through the optic axis and said common point, whereby as said record gate is moved axially carrying the pins, the pins move transversely toward and away from one another adjusting the masks linearly inversely proportional to the magnification.

BENJAMIN E. LUBOSHEZ.

CERTIFICATE OF CORRECTION.

Patent No. 2,256,396. September 16, 1941.

BENJAMIN E. LUBOSHEZ.

It is hereby certified that error appears in the printed specification of the above numbered patent requiring correction as follows: Page 3, first column, line 70, for "it" read --is--; page 7, second column, line 10, claim 5, after "width" insert --masking--; page 8, second column, line 52, claim 14, for "agtes" read --gates--; and that the said Letters Patent should be read with this correction therein that the same may conform to the record of the case in the Patent Office.

Signed and sealed this 2nd day of December, A. D. 1941.

(Seal)

Henry Van Arsdale,
Acting Commissioner of Patents.